Patented Sept. 7, 1937

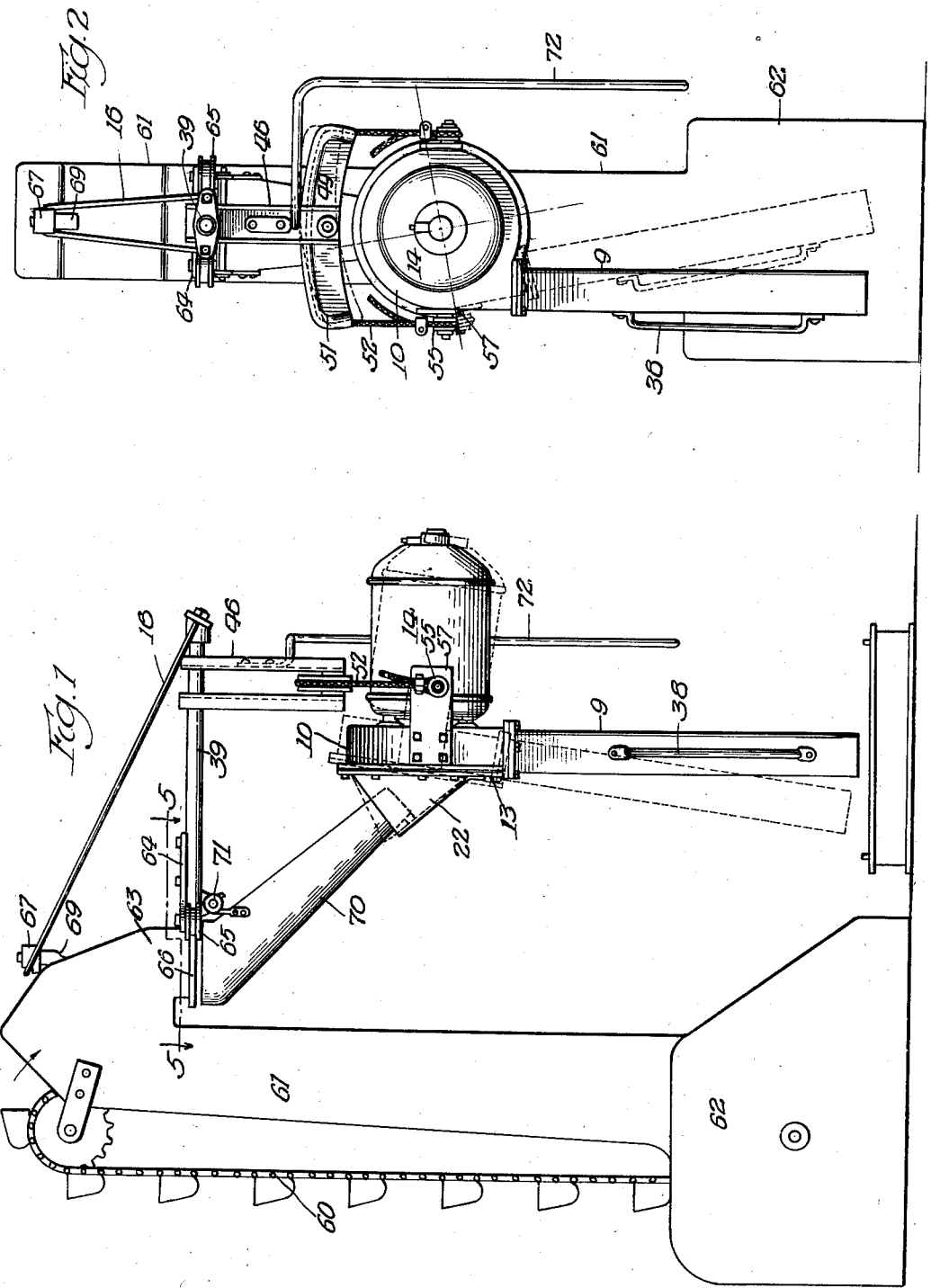

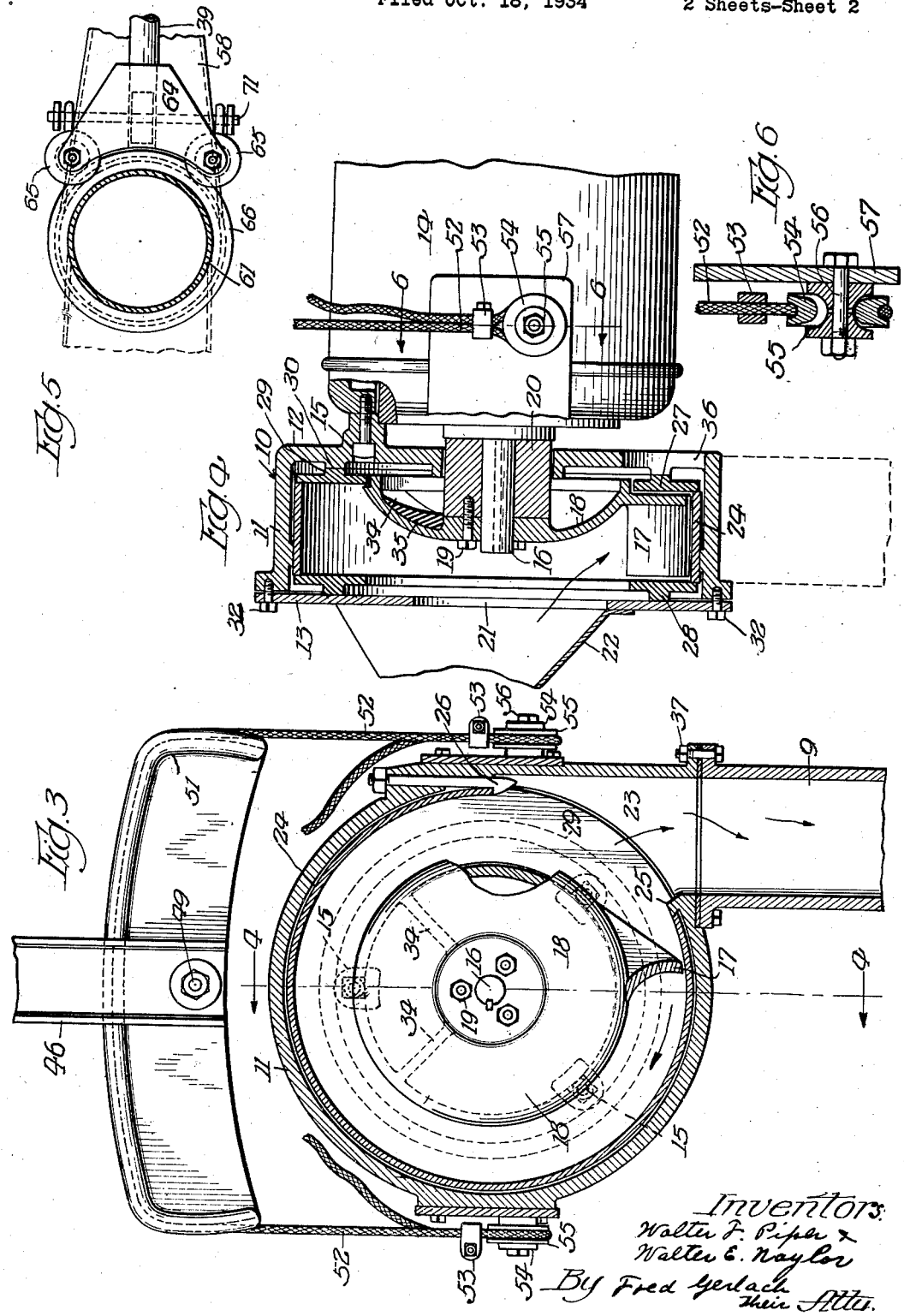

2,092,328

UNITED STATES PATENT OFFICE 2,092,328

APPARATUS FOR FILLING FOUNDRY FLASKS

Walter F. Piper, Oak Park, and Walter E. Naylor, Chicago, Ill., assignors to The Beardsley & Piper Company, Chicago, Ill., a corporation of Illinois Application October 18, 1934, Serial No. 748,794

12 Claims. (Cl. 22—36)

The present invention relates generally to apparatus for filling flasks in making molds for castings. More particularly the invention relates to that type of apparatus in which wads of sand are projected downwardly into the flask by a motor driven high speed rotary projector to ram or pack the sand with the desired density in the flask.

One object of the invention is to provide an apparatus of this type which is an improvement upon and is more simple in construction than previously designed apparatus for the same purpose and is particularly adapted for use in small foundries.

Another object of the invention is to provide an apparatus of the aforementioned type in which the rotary projector and the projector driving motor are in the form of an assembly and are supported or mounted for limited universal turning movement about substantially the center of mass thereof so that they may be manipulated or controlled in order to direct the wads of sand into all portions of the flask.

A further object of the invention is to provide an apparatus of the last mentioned character in which the projector casing and the electric motor for driving the projector are arranged in substantially coaxial relation and the mounting or supporting means whereby the assembly is supported for universal movement about substantially the center of mass thereof is of such design that the assembly is free to rock or turn about the common axis of the projector casing and the motor and also about an axis at right angles to the first mentioned axis.

A still further object of the invention is to provide an apparatus of the character under consideration in which the mounting or supporting means for the projector and motor includes an adjustable flexible element and is so designed that the projector tends to remain in all the various angular positions into which it is shifted.

Other objects of the invention and the various characteristics and advantages of the present flask filling apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Fig. 1 is a side elevation of an apparatus embodying the invention.

Fig. 2 is a front view.

Fig. 3 is a transverse section through the rotary projector.

Fig. 4 is a section on the line 4—4 of Fig. 3.

Fig. 5 is a section on the line 5—5 of Fig. 1.

Fig. 6 is a section on the line 6—6 of Fig. 4.

The apparatus which forms the subject matter of the invention is designed for use in a foundry and comprises as the main or essential parts thereof, a rotary projector for forming sand or other moulding material into wads; an electric motor 14 for driving the projector, and a depending tube for delivering the wads of sand from the projector into a flask on the foundry floor. These three parts constitute a ramming unit or assembly and are suspended from an overhead support, as hereinafter described, so the operator can move the unit or assembly universally to a limited extent about substantially the center of mass thereof to distribute the projected wads of sand to all portions of the flask. The projector embodies a casing 10 which consists of a substantially cylindrical wall 11, an outer side wall 12 and an inner side wall 13. The latter is in the form of a head and is removably secured in place by bolts 32 so that when desired, access may be had to the interior of the casing. The motor is arranged so that its axis is co-axial with the casing and is fixedly and directly secured by bolts 15 to the side wall 12 of the casing. The armature shaft 16 of the motor extends through the side wall 12 and into the casing. A projector blade 17 is secured to a head 18 which is secured by screws 19 to a hub 20. The hub 20 and head 18 are keyed to shaft 16 so as to be driven directly by the motor 14. An inlet 21 through which sand enters the casing of the projector is formed in the side wall 13. A hopper 22 for directing the sand to the inlet 21 is secured to the outside of the side wall 13. The sand entering the casing falls into the lower portion thereof and into the path of the projector head 18. The blade 17 is rotated at a speed ranging from 1200 to 1800 revolutions per minute and is of such size that the tip of the blade 17 will have a speed of approximately 5000 to 7000 feet per minute. During rotation of the head the blade engages the sand in the lower portion of the casing 10 and the centrifugal force and inclination of the blade cause the sand picked up during each revolution to be packed into a wad which is carried around the top of the casing and then discharged through a downwardly extending tangential outlet 23. The sand is delivered into one side of the projector-casing and the shaft for driving the blade extends through the other side of and into the casing. This makes it possible to mount the motor directly on the casing.

To provide for the wear which results from the movement of the sand around the casing, a removable arcuate liner 24 is clamped in the casing between a shoulder 25 at one side of outlet 23 and a hook bolt 26 at the other side of the outlet. The liner 24 co-acts with the blade in forming the sand into wads and conducting them to the outlet 23. The blade 17 rotates between an outer liner ring 27 and an inner liner ring 28. These rings fit inside of the cylindrical wall 11 of the casing and lap the sides of the liner 24. Ring 27 has an annular shoulder 29 which abuts against a shoulder 30 on the wall 12 of the casing and ring 28 has an annular shoulder which abuts against the side wall 13 of the casing. Said side wall 13 together with the bolts 32 serves to clamp the peripheral liner and the rings 28, 29 together and in the casing to secure them against relative longitudinal movement. It is spaced sufficiently from the contiguous side margin of the cylindrical wall 11 of the casing so that the pressure applied to said head by bolts 32 will clamp the liners 28, 29 and the liner 24 in the casing.

The inner face of the head 18 extends from the outer side of the casing to a point beyond the longitudinal center of the blade 17. As shown in the drawings the blade is attached to the head only at its outer side. Radial ribs 34 are formed on the outer face of head 18. The space between these ribs is diametrically opposite to the blade 17 and is filled, as at 35, with suitable metal, such as lead, to counterbalance the blade. The purpose of extending the inner portion of the head 18 inwardly from the outside of the casing is to provide a space for the lead-formed counterweight at the longitudinal center of the blade 17 to balance the blade against longitudinal vibration. The inner face of head 18 between its central portion and its rim is curved to direct some of the sand to the outer side of the casing. The outer periphery of head 18 is grooved so as to lap the inner edge and inner face of ring 27 and prevent sand from escaping from the casing.

An opening 36 is formed in the lower portion of casing wall 12 to permit any sand which may work its way between the head 18 and ring 27 to escape.

One feature of the invention consists in providing flexible suspension means for the ramming unit to permit the operator to swing or tilt the unit universally to a limited extent to direct the wads of sand into all portions of a flask. For this purpose the unit is pivotally suspended at a point sufficiently high to make it possible to distribute the wads in the flask without varying the angle of delivery sufficiently to cause the wads to skid or slide in the flask. The ramming unit or assembly is supported above the normal reach of the operator and the delivery tube 9 is secured to the casing 10 in communication with the tangential outlet 23 through which the wads are discharged by the projector blade. This tube is secured by bolts 37 to said casing and is of sufficient length to conduct the wads to a point adjacent to the flask. It is rigid and is fixed to the casing so that the axis of the tube, with respect to the direction of discharge of the wads, will not be changed when the ramming unit is tilted. A handle 38 is fixed to the tube so the operator can conveniently swing the ramming unit over the flask to direct the wads into all portions thereof. An arm 39 serves as an overhead support for the ramming unit.

The suspension-means whereby the ramming unit or assembly is permitted to be swung or moved universally to a limited extent about substantially the center of mass thereof so the wads formed in the projector can be delivered into all portions of the flask is connected to a pair of hanger-bars 46, the upper ends of which are fixed to the arm 39. Said means comprises a beam or lever 51 which is centrally pivoted on a horizontal pin 49. The latter extends through and between the bars 46. The top and ends of the beam 51 are grooved to receive and support a suspension-cable or flexible element 52 which extends across and depends from both ends of the beam. The depending portions of the cable are secured respectively by clamps 53 around peripherally grooved bushings 54. The ramming unit or assembly is pivotally hung in these bushings by a pair of horizontally alined or coaxial bolts 56 which are secured in plates 57 on opposite sides of the motor and support peripherally grooved split bushings 55. The bushings 55 fit rotatably in and extend through the bushings 54 and they together with the bolts 56 constitute pivotal connections between the ends of the flexible element 52 and the sides of the motor whereby the ramming unit or assembly may be tilted up and down. The bolts 56 extend at right angles to the armature shaft of the motor 14 and are substantially aligned with the center of mass of the unit. As a result of this the unit or assembly is supported in such manner that it is not only free to tilt upwards and downwards about an axis at right angles to the armature shaft but is also balanced as far as the pivot forming bolts are concerned and hence may be moved or manipulated in a free and easy manner by the operator. The friction between the bushings 54 and 55 of the suspension device is sufficient to cause the unit to remain in any of the various tilted positions into which it is swung by the operator. In view of the fact that the lever 51 is centrally pivoted on the horizontal pin 49 and the ends of the suspension cable 52 are pivotally connected by way of the bolts 56 and the bushings 54 and 55 to the sides of the motor, the unit or assembly of projector and motor is free to turn or rock sidewise about the axis of the armature shaft. This axis because it is centrally positioned with respect to the unit passes through the center of mass of the unit and substantially intersects at said center of mass the axis about which the unit is free to tilt up and down. Because the axis about which the unit is adapted to turn or rock sidewise is the axis of the armature shaft such axis may be defined as being in a plane extending lengthwise of and passing through the armature shaft. By reason of the fact that the assembly is free to tilt up and down about an axis at right angles to the armature shaft and passing substantially through the center of mass and also to rock laterally about the armature shaft of the unit limited universal action may be imparted to the unit or assembly and the latter hence controlled so as to cause the wads of sand to fill all portions of the flask. The advantage in having the transverse and longitudinal axes about which the unit is supported for tilting movement substantially intersect one another adjacent to the center of mass of the unit resides in the fact that the unit is so balanced that it not only may be manipulated or swung with ease in connection with a flask filling operation but also tends to remain in the various positions into which it is shifted. By loosening the clamps 53 and either shortening or lengthening the portions of the suspension cable between the bushings 54 and the ends of the lever 51 it is possible to effect a vertical adjustment of the ramming unit or assembly.

In filling a flask, the operator, while the ramming unit or assembly is in operation, can grasp the handle 38 and swing the tube 9 and the other parts of the ramming unit back and forth in a universal manner and thus effect discharge of the wads of sand into all portions of the flask. When the tube 9 is swung back and forth longitudinally or lengthwise with respect to the ramming unit, the latter will tilt up and down about the pivots which are formed by the bushings 54 and 55 at the ends of the suspension cable 52. When the operator swings the delivery tube back and forth at right angles to the aforesaid course or path of swing, the cable will be lowered at one side and raised on the other, and the beam 51 will rock on its pin 49. When this occurs, the ramming unit will turn or swing on its own axis, that is, the axis of the armature shaft. Obviously, the ramming unit may be simultaneously swung about both the transverse and longitudinal axes so that the operator can easily move the delivery tube 9 to fill all portions of the flask with very little exertion.

The sand for filling the flasks is conveyed to the projector by an endless bucket elevator 60 which is carried by a standard 61 on a base 62. The latter is adapted to rest on the foundry room floor. The elevator discharges the sand through a downwardly extending spout 63. The supporting arm 39 is adapted to swing laterally to permit the ramming unit and its suspension device to be moved laterally from one flask to another. The inner end of arm 39 has fixed thereto a plate 64 which carries grooved rollers 65 which ride on a flange 66 on the lower end of spout 63. The outer end of the arm 39 is supported by brace-rods 16, the upper and inner ends of which are looped around and rest on a collar 67 which is mounted on a stud 69 which is vertically co-axial with the spout 63. A conveyor chute 70 is pivotally supported by a cross-rod 71 which is fixed to arm 39. The upper end of this chute receives the sand from spout 63 and its lower end rests loosely in the hopper 22 on the projector-casing to deliver the sand to the casing. The loose connection between the lower end of the chute 70 and the hopper 22 permits the ramming unit to be pivotally moved in filling the flasks and when the unit and arm are moved from one flask to another the chute 70 will move therewith. A handle 72 is secured to one of the bars 46 and depends therefrom so the operator can conveniently shift the arm 39 to bring the ramming unit from one flask to another.

The invention exemplifies a ramming unit consisting of an electric motor and a projector provided with a casing and a rotary propeller blade which is pivotally supported by a flexible suspension device; and also a suspension device which permits the unit to be swung or rocked transversely on its own longitudinal axis and also provides for universal tilting of the ramming unit; and also a suspension device on which the unit is balanced and hung so it will be self-retained in the different angular positions into which it is shifted by the operator.

The invention is not to be understood as restricted to the details set forth since these may be modified within the scope of the appended claims without departing from the spirit and scope of the invention.

What we claim as new and desire to secure by Letters Patent is:

1. In an apparatus of the character described, the combination of a projector comprising a casing with an inlet for mould-forming material and a downwardly directed outlet, and also comprising a rotatable blade in the casing for forming the material in the casing into wads and projecting the latter downwardly through the outlet, an electric motor having the casing thereof connected directly to one side of the projector casing, a shaft extending from the motor into said projector casing for driving the blade from the motor, a support, and means carried by the support for supporting the assembly of projector and motor so that it is free to turn or rotate back and forth about the axis of the shaft and hence may be controlled to direct the wads of mould-forming material into different portions of a flask beneath the projector.

2. In an apparatus of the character described, the combination of a projector comprising a substantially cylindrical casing with a side inlet for mould-forming material and a peripheral downwardly directed outlet, and also comprising a rotatable blade in the casing for forming the material in the casing into wads and projecting the latter downwardly through the outlet, an electric motor located at one side of, and coaxial with, the casing and having the armature shaft thereof extending through the casing and connected to drive the blade, a support, and means carried by said support for supporting the assembly of projector and motor so that it is free to turn or rotate back and forth about the common axis of the projector and motor and also to tilt up and down about an axis at right angles to the first mentioned axis and hence may be controlled to direct the wads of mould-forming material into all portions of a flask beneath the projector.

3. In an apparatus of the character described, the combination of a projector comprising a casing with an inlet for mould-forming material and a downwardly directed outlet, and also comprising a rotatable blade in the casing for forming the material in the casing into wads and projecting the latter downwardly through the outlet, a rigid elongated delivery tube secured to and extending downwardly from the outlet portion of the casing, an electric motor located at one side of the casing, a shaft extending from the motor into the casing for driving the blade from the motor, an overhead support, and means for suspending the projector and motor from the support so that the assembly of projector and motor is free to turn or rotate back and forth about the axis of the shaft and thus permits the operator of the apparatus by manipulation of the tube to direct the wads of mould-forming material into different portions of a flask beneath the projector.

4. In an apparatus of the character described, the combination of a projector comprising a casing with an inlet for mould-forming material and a downwardly directed outlet, and also comprising a rotatable blade in the casing for forming the material in the casing into wads and projecting the latter downwardly through the outlet, an electric motor connected to one side of the casing, a shaft extending from the motor into the casing for driving the blade from the motor, an overhead support, and means comprising a centrally pivoted beam carried by the support and elements between the ends of the beam and the sides of the motor for suspending the assembly of projector and motor from the support so that it is free to turn or rotate back and forth about the axis of the shaft and thus permits the operator of the apparatus to direct the wads of mould-forming material into different portions of a flask beneath the projector.

5. In an apparatus of the character described, the combination of a projector comprising a casing with an inlet for mould-forming material and a downwardly directed outlet, and also comprising a rotatable blade in the casing for forming the material in the casing into wads and projecting the latter downwardly through the outlet, an electric motor connected to one side of the casing, a shaft extending from the motor into the casing for driving the blade from the motor, an overhead support, and means comprising a transversely extending, centrally pivoted beam carried by the support and flexible connections extending downwardly from the ends of the beam and connected pivotally to the sides of the motor for supporting the assembly of projector and motor from the support so that it is free to turn or rotate back and forth about the axis of the shaft and to tilt up and down about an axis at right angles to the first mentioned axis and thus permits the operator of the apparatus to direct the wads of mould-forming material into all portions of a flask beneath the projector.

6. An apparatus of the character described, comprising in combination a supporting structure, a rotary projector of the casing and blade equipped rotor type adapted to fill a subjacent flask with mould-forming material, an electric motor connected to one side of, and positioned in substantially coaxial relation with, the casing of the projector and having the armature shaft thereof connected to drive the projector rotor, and a mounting between the assembly of projector and motor and the supporting structure for supporting said assembly so that it can tilt up and down about an axis extending substantially through the center of mass of said assembly and at right angles to the armature shaft.

7. An apparatus of the character described, comprising in combination a supporting structure, a rotary projector of the casing and blade equipped rotor type adapted to fill a subjacent flask with mould-forming material, an electric motor connected to one side of, and positioned in substantially coaxial relation with, the casing of the projector and having the armature shaft thereof connected to drive the projector rotor, and a mounting between the assembly of projector and motor and the supporting structure for supporting said assembly so that it can tilt up and down about an axis extending substantially through the center of mass of said assembly and at right angles to the armature shaft, and also rock sidewise about an axis extending at right angles to said first mentioned axis.

8. An apparatus of the character described, comprising in combination a supporting structure, a rotary projector of the casing and blade equipped rotor type adapted to fill a subjacent flask with mould-forming material, an electric motor connected to one side of, and positioned in substantially coaxial relation with, the casing of the projector and having the armature shaft thereof connected to drive the projector rotor, and a mounting between the assembly of projector and motor and the supporting structure for supporting said assembly so that it can tilt up and down about an axis extending substantially through the center of mass of said assembly and at right angles to the armature shaft of the motor, and also rock sidewise about an axis lying in a plane extending at right angles to the first mentioned axis and passing lengthwise through said armature shaft.

9. An apparatus of the character described, comprising in combination a supporting structure, a rotary projector of the casing and blade equipped rotor type adapted to fill a subjacent flask with mould-forming material, an electric motor connected to one side of, and positioned in substantially coaxial relation with, the casing of the projector and having the armature shaft thereof connected to drive the projector rotor, and a mounting between the assembly of projector and motor and the supporting structure for supporting said assembly so that it can tilt up and down about an axis extending substantially through the center of mass of said assembly and at right angles to the armature shaft, and also rock sidewise about an axis extending at right angles to said first mentioned axis and substantially intersecting the latter at said center of mass of the assembly.

10. An apparatus of the character described, comprising in combination a supporting structure, a rotary projector of the casing and blade-equipped rotor type adapted to fill a subjacent flask with mould-forming material, an electric motor connected to one side of the casing and having the armature shaft thereof connected to drive the projector rotor, and a mounting between the assembly of projector and motor and the supporting structure for supporting said assembly so that it is free to tilt universally to a limited extent about substantially the center of mass thereof and hence can be controlled or manipulated to direct the wads into different portions of the flask.

11. An apparatus of the character described, comprising in combination a supporting structure, a rotary projector of the casing and blade-equipped rotor type adapted to fill a subjacent flask with mould-forming material, an electric motor connected to one side of the casing and having the armature shaft thereof connected to drive the projector rotor, and a mounting between the assembly of projector and motor and the supporting structure for supporting said assembly so that it is free to turn or rotate about longitudinal and transverse axes substantially intersecting one another adjacent to the center of mass of the assembly, and hence can be controlled or manipulated to direct the wads into different portions of the flask.

12. An apparatus of the character described, comprising in combination an overhead support, a rotary projector and projector driving motor connected together in side by side relation and adapted to sling wads of mould-forming material into a subjacent flask, and a mounting whereby the assembly of projector and motor is suspended from the structure for limited universal movement about substantially the center of mass thereof.

WALTER F. PIPER.
WALTER E. NAYLOR.